Oct. 7, 1930.                J. P. FISHER                1,777,356
                        HEAT INTERCHANGE APPARATUS
                           Filed May 17, 1927
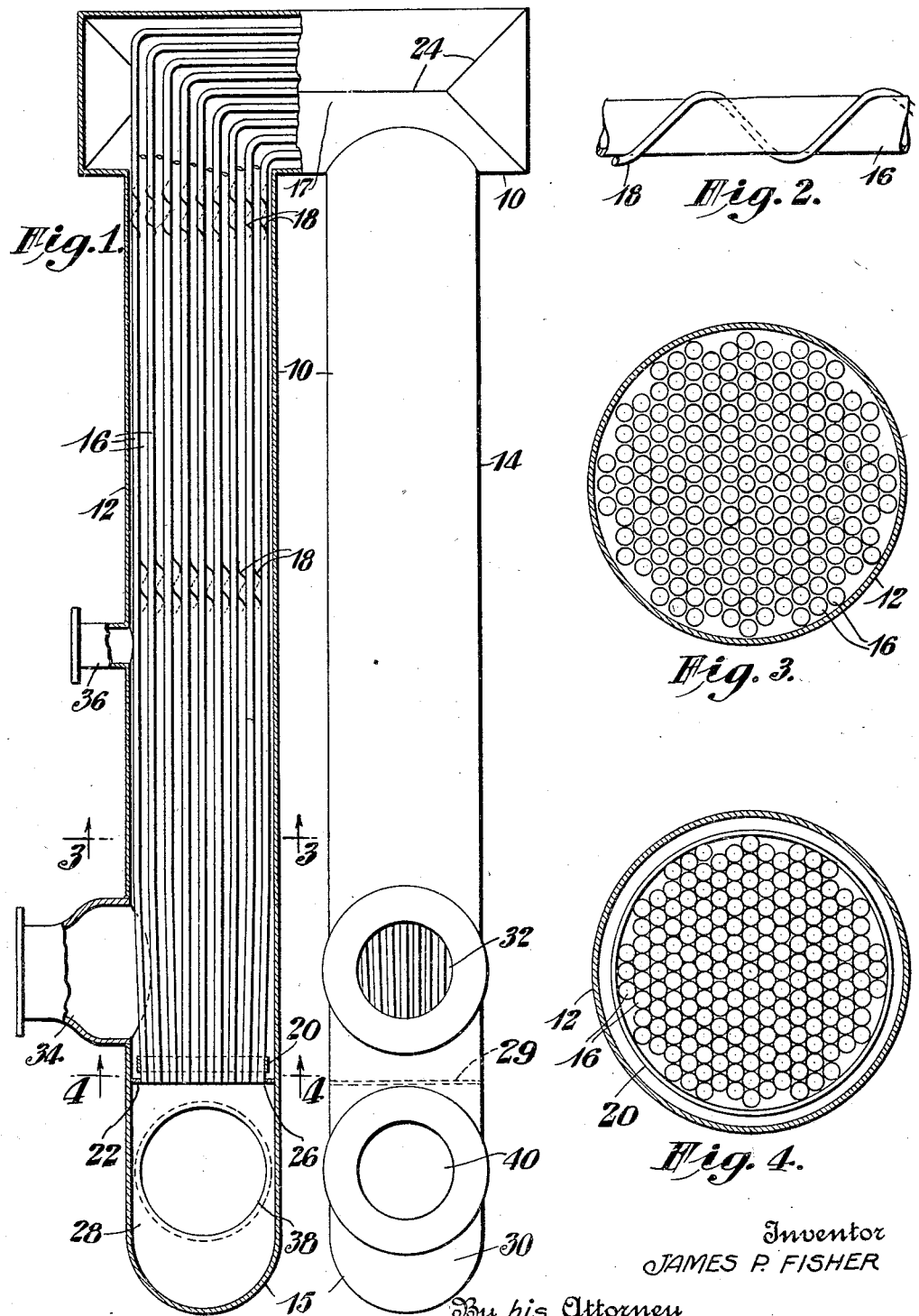
Inventor
JAMES P. FISHER
By his Attorney
Edmund G. Borden Patented Oct. 7, 1930

1,777,356

UNITED STATES PATENT OFFICE

JAMES P. FISHER, OF BARTLESVILLE, OKLAHOMA, ASSIGNOR TO EMPIRE GAS AND FUEL COMPANY, OF DOVER, DELAWARE, A CORPORATION OF DELAWARE

HEAT-INTERCHANGE APPARATUS

Application filed May 17, 1927. Serial No. 191,967.

This invention relates to heat interchange apparatus, and more particularly to heat interchange apparatus of the recuperator type designed to heat one body of fluid by indirect heat interchange with another body of fluid through the medium of a heat-conducting partition or diaphragm.

There are many heat interchangers of the recuperator type now available which in their commercial design include an outer shell or housing enclosing a tubular inner diaphragm structure. In operating recuperators of this type one of the fluids to be treated is conducted through the inner tubes while the other fluid passes through the recuperator in the interstitial passages formed between the outer shell and the outer surfaces of the inner tubes. In assembling recuperators of this type the practice is to mount the opposite ends of the inner tubes in tube sheets by rolling them in place in apertures in the tube sheets cut to form a close fit therewith, and then to mount the assembled nest of tubes and tube sheets in the outer shell of the recuperator by a bolted flange construction. One objection to this method of assembling this type of recuperator is that it is impossible and impracticable to space the inner tubes close enough together so that the velocities of the fluids passed respectively through the outer passages and inner tubes of the recuperator can be substantially balanced, thereby affording a maximum heat transfer capacity of the recuperator per unit area of diaphragm surface. In order to lessen the effect of the above limitation in assembling recuperators of this type recourse has been had to baffle plates or other devices for increasing the velocity of the fluid in the outer passages of the recuperator, i. e., in the passages having the largest cross-sectional area; but the use of such devices has been only partially successful in effecting the desired adjustment between the rates of flow of fluid respectively in the tubes and in the passages surrounding the tubes of the recuperator. Another marked objection to recuperators of the above type is the high cost of the many flanged joints, with the attending machine work, bolts and gaskets involved in their assembly, together with the fact that recuperators assembled in this manner are likely to develop mechanical weakness and leaks, especially when one or both of the fluids handled therein are under high pressure.

One object of the present invention is to provide a fluid heat interchange apparatus of the recuperator type designed to afford a substantially balanced velocity flow of fluids through the inner flues and through the outer interstitial passages of the recuperator, with consequent substantially maximum heat transfer capacity per unit area of heat conducting diaphragm.

Another object of the invention is to provide recuperator type heat interchange apparatus of simple and compact design, the assembly of which will involve a relatively low cost.

Another object of the invention is to provide a recuperator type heat interchanger which can be easily assembled at relatively low cost and which is at the same time strong mechanically and capable of handling fluids under relatively high pressures without leakage.

With these and other objects and features in view the invention consists in the improved recuperator type heat interchanger hereinafter described and more particularly defined in the claims.

The various features of the invention are illustrated in the accompanying drawings, in which:

Fig. 1 is a view, partly in side elevation and partly in diametrical section, of the assembled recuperator;

Fig. 2 is a view of a portion of one of the inner flues or tubes, illustrating the manner in which the helical spacer rods are fitted thereto;

Fig. 3 is a cross-sectional view through one leg of the recuperator, taken on the line 3—3 of Fig. 1; and Fig. 4 is a cross-sectional view through one leg of the recuperator, taken on the line 4—4 of Fig. 1.

In the following description of the recuperator type heat interchanger forming the subject of the present invention it will be assumed that the recuperator structure illustrated in the drawings is to be used to effect preheating of a body of combustible gas on its way to an adjacent reaction chamber wherein it is to be subjected to combustion reactions, by means of a heat interchange with a body of hot gaseous products of the combustion reactions. It is to be understood, however, that the reference to specific gases in the following discussion is purely in the interests of clarifying the description of the apparatus, and that it is not intended by such reference that the scope of application of the apparatus of the invention shall be construed as in any way limited to the specific types of fluids mentioned.

The apparatus of the present invention, as it is illustrated in its preferred form in the accompanying drawings, comprises essentially a U-shaped outer shell or casing 10 having each of its two legs 12 and 14 closed or sealed off in a dead end 15 at one end and united at the other end by a return bend 17 constructed as an integral part of the shell 10 (see Fig. 1). The shell 10 houses a plurality of inner U-shaped tubes or flues 16, each of tubes 16 being preferably held in uniformly spaced relation to each of the other like tubes by helical metal coils or wrappings 18 (see Fig. 2). The tubes 16 when assembled in the recuperator form a U-shaped nest having one of its ends or legs positioned in each of the legs 12 and 14 of the shell 10. In assembling the recuperator, tubing is first assembled in a U-shaped bundle with the ends of all the tubes in a common plane, and the two legs of the nest thus formed are then drawn at their ends into a compact unit held by a tightly fitting clamp member or ring 20 in such a way that the exterior wall of each tube is in contact with and bears tightly against the walls of adjoining tubes. The assembling of the nest of tubes is completed by welding the bunched ends of the tubes in the nest together and to rings 22 in such a way that the weld fills the interstices between the ends of the tubes making up the nest, thereby forming a sort of header sheet or gas-tight floor of welded metal at each end of the nest of tubes. After assembling the nest of tubing outside of the shell 10 the nest is inserted into the shell through an oblong hole provided in the U-bend connection 17, and each end of the nest or bundle of inner tubes is then attached to the shell by uniting the projections or rings 22 on each end of the tube nest to the shell wall near dead ends of the corresponding legs 12 and 14 of the recuperator shell by a welded joint, thereby completing a connection between each end of the nest of tubing and the outer shell 10 by a welded metal flue sheet construction. After thus joining the nest of tubing at its ends by a welded metal flue sheet to the corresponding legs of the shell 10, the oblong hole in the U-bend connection through which the assembled nest of tubing was inserted in the casing 10 is closed by welding along a seam indicated as 24 in Fig. 1 of the drawings.

In its assembled form the present heat interchanger therefore embodies a plurality of U-shaped tubes 16, each communicating at one end below a partition flue sheet or floor 26 of welded metal with a space 28 formed in the dead end of leg 12, while its other end communicates with a corresponding space 30 in the dead end of the leg 14. The interstitial space surrounding the tubes 16 in the main body of the recuperator above the welded metal flue sheets openly communicates with a flanged nozzle 32 in leg 14 above the welded tube sheet 29 and also communicates with a corresponding flanged nozzle 34 opening into leg 12 above welded partition 26.

In the operation of the recuperator the fluid to be heated, for purposes of illustration considered as a combustible gas on its way to a combustion chamber (not shown), enters the space 28 in the dead end of leg 12 from a source of supply through a flanged nozzle 38 and after passing through the length of flues 16 and thereby taking on preheat by direct contact with the inner heat conducting walls of the flues 16, the thus heated gas exits from the recuperator on its way to the combustion chamber (not shown) through a flanged nozzle 40 in the dead end of leg 14. The heating fluid, for purposes of illustration considered as hot products of combustion leaving the aforementioned combustion chamber (not shown), enters the main heating section of the recuperator through a nozzle 32 in leg 14 and after traversing the interstitial passages surrounding the flues 16 and simultaneously undergoing considerable drop in temperature by direct heat transfer with the outer heat-conducting walls of the flues 16, the thus cooled heating gas exits from the recuperator on its way to a stack (not shown) through nozzle 34 in leg 12. A flanged nozzle 36 is shown in Fig. 1 opening into leg 12 of the recuperator about midway between nozzle 34 and U-bend 17. This nozzle 36 affords an atmospheric relief for draining the pressure from the combustion chamber and the outer passages of the interchanger.

In designing the heat interchanger of the present invention for use in heating a fluid passed through its inner tubes by indirect heat transfer from a fluid passed through its outer passages, as in the example above described, a greater cross-sectional area is preferably provided in the outer passages of the recuperator in order to accommodate an increased volume of combustion products or other heating fluid over the volume of combustible gas or other fluid to be heated. However it will be understood that the heat interchanger may be designed for use in preheating fluid in its outer passages by indirect heat transfer from fluid passed through its inner tubes, and in this case it may be desirable to provide a greater cross-sectional area in the inner passages than in the outer phase in order to accommodate an increased volume of heating fluid over the corresponding volume of fluid to be heated. Likewise it will be understood that the nozzle 36, instead of serving simply as a pressure relief exit, may be used as an inlet through which a predetermined volume of air or other fluids may be admitted to the outer passages of the recuperator for admixture with the body of fluid being passed through said outer passage immediately prior to the exit of such fluid from the recuperator through the nozzle 34.

By varying the number, size and spacing of the spirally arranged spacer rods 18 it is possible to vary the distances between adjacent tubes in the nest throughout the main heating body of the recuperator and to make some adjustment in the ratio between the cross-sectional area of the interstitial passages surrounding each of the tubes in each recuperator leg and the inner cross-sectional area of the tubes so as to secure the best possible heat transfer capacity consistent with a reasonable pressure drop in the bodies of fluid passing through the two sections of the recuperator. The number of tubes 16 making up the nest, as well as the sizes of the outer shell, tubes and wire spacers 18 separating the tubes, can of course be varied in assembling the nest so as to effect a suitable adjustment between the respective cross-sectional areas of the recuperator tubes and surrounding passages to insure a maximum heat transfer capacity under any conditions of operation when handling uniform or variable volumes of fluids in the tubes and outer passages respectively. It will be noted that the spacers 18 serve not only for properly spacing the recuperator tubes 16 one from another, but also as baffles acting to redistribute the flow of fluid in the outer passages of the recuperator and thereby add to its turbulence. The construction of the recuperator type heat interchanger of the present invention is therefore such that the velocity of the fluid passing through the outer passages of the recuperator can be adjusted to and kept at the most advantageous value as compared to the velocity of the fluid passing through the inner tubes. Normally the highest heat transfer capacity of the recuperator is realized when the ratio between the cross-sectional areas of the inner tubes and outer passages of the recuperator are adjusted to provide a substantially balanced velocity of fluid flow both in the inner tubes and in the outer passages.

By attaching the nest of inner tubes to the outer casing of the recuperator by a welded flue sheet construction near the dead end of each leg of the outer casing, the detrimental effects of temperature strains throughout the metal in the various sections of the recuperator are entirely avoided, the nest of tubes being entirely free of the outer casing except at the single point of attachment in each of the legs thereof. By constructing the outer shell 10 of the recuperator in such a way that the tube nest, completely assembled and with all seams welded, can be inserted through an oblong opening in the cap of the U-bend 17, and the final assembly of tube nest and shell thereafter completed by simply welding the joints 22 between the two ends of the tube nest and the opposite inner wall of the shell and by closing the opening in the cap of the U-bend by a welded connection on edges 24, the high cost of flanged joints, with the attending machine work, bolts and gaskets is avoided, so that the cost of construction per square foot of heating surface of the present heat interchanger is relatively much lower, and the facility with which it can be assembled is relatively much greater, than for other commercial type interchangers at present available.

Another advantageous feature of the recuperator type heat interchanger of the present invention is that by reason of its construction from one piece tubes 16 and a one-piece outer casing 10, for assembly in a unitary structure by welded joints, without the use of any bolted flanges with attendant gaskets, rivets, bolts, or similar devices, in such a way that no mechanical temperature strains or the like occur in any of its parts, it is possible to operate the recuperator while maintaining a high pressure differential between the fluids in the outer passages and inner tubes of the interchanger and the surrounding atmosphere without any of the difficulties from failures or leaks normally encountered with most commercial type heat interchangers now available.

Having thus described my invention, what I claim as new is:

1. In a heat interchanger, in combination, a plurality of heat conductant metal flues assembled together in a nest, flue sheet headers of welded metal on each end of the nest, a tightly fitted clamping ring at each end of the nest adjacent the header arranged to hold the ends of the flues in compact relationship with their walls substantially abutting, helical metal wrappings for the flue whereby they are held in spaced relationship intermediate the ends of the nest, an outer pressure resistant metal casing arranged to enclose and conform closely in contour with said nest, and nozzles opening into said casing on opposite sides of said welded flue sheets for the admission and exit of fluid to be heated and heating fluid respectively, to and from the flues and to and from the interstitial passages formed between the outer walls of the flues and the casing.

2. A heat interchanger as specified in claim 1 in which the flues and casing are U-shaped and in which the U-bent of the casing is designed for closure by welding after insertion of the nest of flues therein.

In testimony whereof I affix my signature.

JAMES P. FISHER.